United States Patent
Ueno et al.

(10) Patent No.: US 6,340,533 B1
(45) Date of Patent: Jan. 22, 2002

(54) SPIN-VALVE MAGNETORESISTANCE SENSOR AND THIN FILM MAGNETIC HEAD

(75) Inventors: Masaki Ueno; Hideyasu Nagai, both of Osaka; Tatsuo Sawasaki, Amagasaki; Fuminori Hikami, Osaka, all of (JP)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/443,953

(22) Filed: Nov. 19, 1999

(51) Int. Cl.$^7$ .................. B32B 15/00; B32B 15/04; G11B 5/127; G11B 5/39
(52) U.S. Cl. ................ 428/611; 428/627; 428/679; 428/698; 360/324.11; 365/158
(58) Field of Search .................. 428/611, 627, 428/678, 679, 682, 694 MM, 694 EC, 694 TM, 693, 698, 699, 900, 332; 360/113, 110, 126, 324.11, 324.12, 324; 324/207.21; 330/62; 365/8, 158

(56) References Cited

U.S. PATENT DOCUMENTS 6,127,053 A * 10/2000 Lin et al. ............... 428/692
6,154,349 A * 11/2000 Kanai et al. ........... 360/324.12
6,175,476 B1 * 1/2001 Huai et al. ............. 360/324.11
6,221,172 B1 * 4/2001 Saito et al. ................ 148/108
6,249,406 B1 * 6/2001 Gill et al. .............. 360/324.11
6,252,750 B1 * 6/2001 Gill ....................... 360/324.11

* cited by examiner

*Primary Examiner*—Deborah Jones
*Assistant Examiner*—Michael LaVilla
(74) *Attorney, Agent, or Firm*—Blakely, Sokoloff, Taylor & Zafman, LLP

(57) ABSTRACT

A synthetic-type spin-valve MR sensor having a pinned magnetic layer with a multi-layer film structure. In one embodiment, on a substrate are formed by layering a free magnetic layer, a pinned magnetic layer including first and second ferromagnetic films, which are mutually coupled antiferromagnetically and which enclose a nonmagnetic coupling film. A nonmagnetic conductive layer is enclosed between these two magnetic layers. An antiferromagnetic layer neighbors the pinned magnetic layer. The first ferromagnetic film neighboring the antiferromagnetic layer is formed from a high-resistivity Co-base material. By making the products of the saturation magnetization and the film thickness of the first ferromagnetic layer and the second ferromagnetic layer substantially equal, the apparent magnetic moment of the pinned magnetic layer as a whole is zero, and the magnetostatic action on the free magnetic layer is eliminated or reduced. Shunting of the sense current to the first ferromagnetic film is suppressed, and a high rate of magnetoresistive change is obtained.

3 Claims, 1 Drawing Sheet

SPIN-VALVE MAGNETORESISTANCE SENSOR AND THIN FILM MAGNETIC HEAD

BACKGROUND OF THE INVENTION

1. Field of the Invention

This invention concerns a spin-valve magnetoresistance sensor in which a free-side magnetic layer, nonmagnetic layer, and fixed-side magnetic layer are formed by layering on a substrate, and in which the magnetization of the fixed-side magnetic layer is fixed by an antiferromagnetic layer. In particular, it concerns a so-called synthetic type spin-valve magnetoresistance sensor in which multiple ferromagnetic films are formed by layering with fixed-side magnetic films enclosing a nonmagnetic coupling film, and a thin film magnetic head provided with this magnetoresistance sensor.

2. Background Information

In the past, in order to obtain a high magnetic field sensitivity from magnetic heads used for reproduction, magnetoresistance (MR) sensors with a spin-valve film structure exhibiting a giant magnetoresistance effect have been developed. In general, spin-valve MR films have a sandwich structure in which two opposing magnetic layers with an intervening nonmagnetic layer are formed by layering on a substrate. Whereas the fixed-side (pinned) magnetic layer has its magnetization fixed parallel to the signal magnetic field by the exchange-coupling magnetic field with the neighboring antiferromagnetic layer, the magnetization of the free-side (free) magnetic layer comprises a single magnetic domain through a hard-bias method utilizing the magnetic field of a permanent magnet, and so can be rotated freely by an external magnetic field.

When the magnetization of the free magnetic layer rotates due to the external magnetic field from magnetic recording media or other source, the angular difference in the directions of the magnetizations appearing in the two magnetic layers causes a change in the magnetoresistance of the MR film, which enables the signal recorded in the recording media to be detected. A spin-valve film is ideal when used in a state in which the magnetization direction of the pinned magnetic layer and the magnetization direction of the free magnetic layer are orthogonal, since good linear response with a broad dynamic range is then obtained. However, the pinned magnetic layer, as a single layer, has a magnetic moment, and the magnetostatic action of the latter may in some cases affect the free magnetic layer such that the magnetization direction is no longer uniform. Consequently part of the MR sensor is quickly saturated under a signal magnetic field, there is concern that the symmetry of the sensor output might be impaired, and the dynamic range might be limited.

Hence recently, as for example has been disclosed in laid-open patent application Hei7-169026 and elsewhere, a synthetic spin-valve MR sensor has been proposed which uses, in place of the single layer of the prior art, a multi-layer structure pinned magnetic layer in which two ferromagnetic films are formed by layering to enclose a ruthenium (Ru) or other nonmagnetic coupling film. In this pinned magnetic layer, the two ferromagnetic films have their magnetizations in anti-parallel orientation and are strongly antiferromagnetically coupled, and moreover the magnetic moments of the two ferromagnetic films cancel each other. In this way the adverse influence on the free magnetic layer of the magnetostatic action is eliminated or reduced, the sensor sensitivity is raised, and higher recording densities can be employed in magnetic recording.

In the synthetic-type spin-valve MR sensor described above, spin-dependent electron scattering which causes changes in the magnetoresistance occurs depending on the angular difference between the magnetization directions in the second ferromagnetic film of the pinned magnetic layer and the free magnetic layer. Hence from the standpoint of obtaining a larger relative magnetoresistance change, it is desirable that the electrical resistance arising from other causes such as impurities and film defects, that is, the resistivity of the second ferromagnetic film, the free magnetic layer and the nonmagnetic layer, be small. To this end, in addition to the Ni—Fe alloy which is generally used in the pinned magnetic layer of the aforementioned ferromagnetic film, Co, Co—Fe alloy, and other ferromagnetic materials are adopted, as described in the aforementioned laid-open patent application Hei7-169026 and elsewhere.

However, the resistivity of Co and Co—Fe alloy is approximately 15 $\mu\Omega$-cm, lower than NiFe. Hence it is easier for a sense current to flow in the first ferromagnetic film neighboring the antiferromagnetic layer; and so there is the problem that, under the influence of this shunting action the relative magnetoresistive change is reduced, lowering the sensitivity of the sensor.

SUMMARY OF THE INVENTION

A spin-valve magnetoresistance sensor is disclosed. In one embodiment, the spin-valve magnetoresistance sensor includes a free magnetic layer and a pinned magnetic layer. The pinned magnetic layer includes first and second ferromagnetic films formed in layers to enclose a nonmagnetic coupling film. The first ferromagnetic film is antiferromagnetically coupled to the second ferromagnetic film. The spin-valve magnetoresistance sensor also includes a nonmagnetic layer enclosed between the pinned and free magnetic layers and an antiferromagnetic layer neighboring the pinned magnetic layer. The antiferromagnetic layer is formed over a substrate. The first ferromagnetic film neighbors the antiferromagnetic layer and is formed of a high-resistivity Co-based material.

BRIEF DESCRIPTION OF THE DRAWINGS

The present invention detailed illustrated by way of example and not limitation in the accompanying figures.

EXPLANATION OF SYMBOLS

Figure 1:
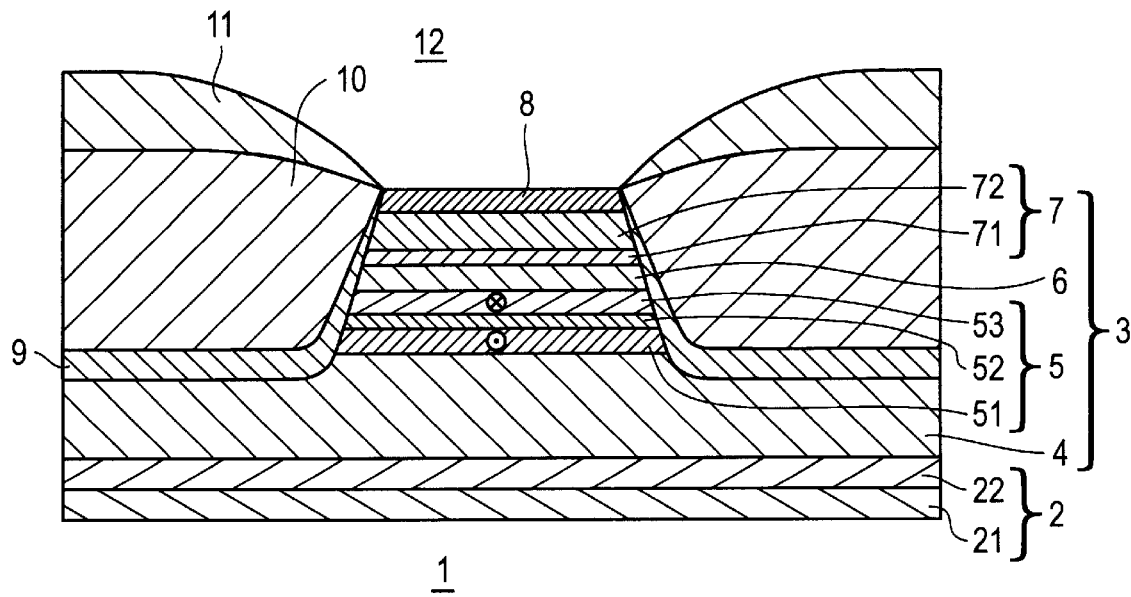
FIG. 1 is a cross-sectional diagram, seen from the ABS side, of a preferred real example of a spin-valve magnetoresistance sensor of this invention.

1 Insulating layer
2 Base layer
3 MR film
4 Antiferromagnetic layer
5 Pinned magnetic layer
6 Nonmagnetic conductive layer
7 Free magnetic layer
8 Protective layer
9 Hard bias base layer
10 Hard bias layer
11 Conductive lead
12 Alumina insulating layer
21 Tantalum film
22 Nickel-iron-chromium film 51 First ferromagnetic film
52 Nonmagnetic coupling film
53 Second ferromagnetic film
71 Cobalt-iron film
72 Nickel-iron film

DETAILED DESCRIPTION

The present invention was devised in consideration of the aforementioned problem of the prior art. One embodiment of the present invention provides a high rate of magnetoresistive change and high sensor sensitivity in a synthetic-type spin-valve MR sensor having a pinned magnetic layer with a multi-layer structure. One embodiment of the present invention provides a high-performance thin film magnetic head capable of achieving high recording densities.

One embodiment of the present invention provides a spin-valve magnetoresistance sensor, characterized by the facts of including a freeside magnetic layer, a fixed-side magnetic layer, a nonmagnetic layer enclosed between these two magnetic layers, and an antiferromagnetic layer neighboring the fixed-side magnetic layer, formed in layers on a substrate; of the fixed-side magnetic layer including a first and a second ferromagnetic film, formed in layers to enclose a nonmagnetic coupling film and coupled antiferromagnetically; and of the first ferromagnetic film neighboring the antiferromagnetic layer being formed of high-resistivity Co-base material.

With this configuration, a high relative magnetoresistive change is obtained, and at the same time shunting of the sense current to the first ferromagnetic film on the antiferromagnetic layer side is suppressed, so that a decline in the relative magnetoresistive change can be prevented.

As such high-resistivity Co-base materials, CoFeB, CoMnB, CoFeC, or other alloy materials can be used to form the first ferromagnetic film; it is desirable that the resistivity be controlled with the range of several tens to several hundreds of $\mu\Omega$-cm by adjusting the amounts of B or C added to these materials.

Further, as high-resistivity Co-base materials forming the first ferromagnetic film, CoZrTa, CoZrNb or CoZrMo can be made amorphous by appropriately choosing the Zr, Ta and other contents; these amorphous materials have a relatively high resistivity of approximately 100 $\mu\Omega$-cm, and so are preferable.

In a separate real example, in the first ferromagnetic film and second ferromagnetic film comprising the aforementioned fixed-side magnetic layer, if the products of the saturation magnetization and film thickness are made substantially equal, then the magnetic moments of both the ferromagnetic films cancel each other out so that the apparent magnetic moment of the fixed-side magnetic layer as a whole is zero, and the magnetostatic action on the free-side magnetic layer can be eliminated or reduced, and so this is preferable.

A separate aspect of this invention provides a thin film magnetic head equipped with such a high-sensitivity synthetic-type spin-valve magnetoresistance sensor, capable of high recording densities.

FIG. 1 shows a preferred real example of a spin-valve MR sensor to which the present invention is applied. In this spin-valve MR sensor, an alumina ($Al_2O_3$) insulating layer 1 is provided on a substrate including glass, silicon, $Al_2O_3$-TiC and other ceramic material, and on top of this a base layer 2 is formed. The base layer 2 of this real example has a two-layer structure including a tantalum (Ta) layer 21 of thickness 30 Å and a nickel-iron-chromium (NiFeCr) layer 22 of thickness 50 Å, deposited by DC magnetron sputtering, in order to improve the (111) orientation of the antiferromagnetic layer of the MR film 3 and formed by layering on top and that of each of the layers above.

The MR film 3 has an antiferromagnetic layer 4 including a platinum-manganese (PtMn) film 250 Å thick on top of the base layer 2, and a pinned magnetic layer 5 formed by layering on top of this and including a three-layer structure of a first ferromagnetic film, nonmagnetic coupling film, and second ferromagnetic film. In this real example, the first ferromagnetic film 51 is formed of a cobalt-iron-boron (CoFeB) film of thickness 20 Å, the nonmagnetic coupling film 52 of a ruthenium (Ru) film of thickness 8.5 Å, and the second ferromagnetic film 53 of a cobalt-iron (CoFe) film of thickness 20 Å, respectively.

On top of the pinned magnetic layer 5 is formed a nonmagnetic electrically conducting layer 6 including a copper (Cu) film 22 Å thick; on top of this is formed by layering a free magnetic layer 7 with a two-layer structure including a cobalt-iron (CoFe) film 71 10 Å thick, and a nickel-iron (NiFe) film 72 40 Å thick. On this MR film 3 adheres a protective layer 8 including a Ta film 30 Å thick. Each of these film layers is similarly deposited by DC magnetron sputtering.

By subjecting the MR film 3 to heat treatment of, for example, 10 hours at 250° C. in a magnetic field of 15 kG in vacuum after deposition, the PtMn antiferromagnetic layer 4 is ordered, and a unidirectional anisotropy is imparted to the CoFeB first ferromagnetic film 51, fixing the direction of its magnetization. By appropriately setting the thickness of the nonmagnetic coupling film 52 such that the first and second ferromagnetic films 51, 53 are coupled antiferromagnetically, the magnetizations are oriented parallel to the signal magnetic field from magnetic recording media and antiparallel to each other.

Further, the film thickness (t) of the aforementioned first ferromagnetic film is selected such that its product with the saturation magnetization ($M_s$) is substantially equal to the product of the film thickness and the saturation magnetization of the aforementioned second ferromagnetic film, that is, such that the difference in the products is substantially zero. Thus, the magnetic moments of the two ferromagnetic films cancel each other, and the apparent magnetic moment of the pinned magnetic layer 5 as a whole is zero, so that the magnetostatic action on the free magnetic layer 7 can be eliminated or reduced.

In actuality, in addition to the magnetostatic action of the pinned magnetic layer, other primary factors exerting an adverse influence on the symmetry of the sensor output are thought to be the magnetic field due to the sense current and the ferromagnetic interaction between the free magnetic layer and the pinned magnetic layer. Hence, even if the apparent magnetic moment of the pinned magnetic layer 5 is reduced to zero, in some cases the asymmetry in the sensor output cannot be eliminated completely. Therefore by setting the difference in the values $M_s \times t$ of the two aforementioned ferromagnetic films not to zero, but to a value in a certain range of minute values, for example 0.30 memu/cm$^2$ or less, taking into account the balance with the effects of the other factors mentioned above, the asymmetry of the sensor output can be controlled more satisfactorily, and so this is preferable.

As the first ferromagnetic film 51 neighboring the antiferromagnetic layer 4, in addition to the CoFeB described above, cobalt-manganese-boron (CoMnB), cobalt-iron-carbon (CoFeC), and other Co-base ferromagnetic materials can be used. The resistivity of these Co-base materials can be controlled within the range of several tens to several hundreds of $\mu\Omega$-cm by adjusting the amounts of B and C added. Hence by selecting a composition with a high resistivity, shunting of the sense current to the first ferromagnetic film can be suppressed, and a large rate of magnetoresistive change compared with the CoFe or other material of the prior art is obtained.

Moreover, as the first ferromagnetic film 51, a Co-base ferromagnetic material including an alloy of cobalt-zirconium (CoZr) to which Ta, niobium (Nb), molybdenum (Mo) and other elements are added, with the Zr and additive Nb or other element contents selected appropriately, and rendered amorphous, can be used. This amorphous material similarly has a comparatively high resistivity of approximately 100 $\mu\Omega$-cm, and so an effect similar to the other Co-base materials described above is obtained.

As the nonmagnetic coupling film 52, as described in the aforementioned laid-open patent application Hei7-169026, Cr, rhodium (Rh), iridium (Ir), and alloys of these containing Ru can also be used in addition to Ru. Also, as the aforementioned antiferromagnetic layer, in addition to PtMn described above, various antiferromagnetic materials previously known such as PdPtMn system, NiMn system, IrMn system, RhMn system, FeMn system, and NiO system materials can be used.

Both sides of the MR film 3 are removed by etching such that at least the free magnetic layer 7 has the prescribed track width, and such that both side parts on the outside from the aforementioned free magnetic layer of the antiferromagnetic layer 4 are only partially eliminated, and a hard bias base layer 9 and hard bias layer 10 are formed on top of both side parts of the aforementioned antiferromagnetic layer. On top of the hard bias layer 10 are formed a pair of conducting leads 11 as electrodes to pass the sense current. Further, this entire layered structure is covered by an alumina insulating layer 12, to complete the spin-valve MR sensor of this invention.

Figure 2:
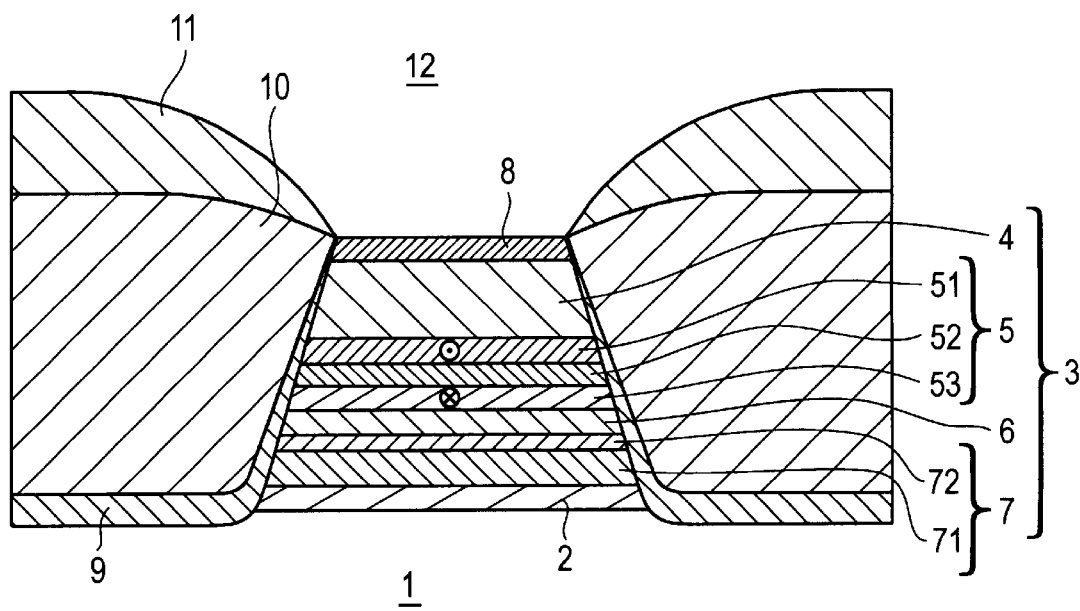
FIG. 2 is a across-sectional diagram, similar to FIG. 1, of another real example of a spin-valve magnetoresistance sensor of this invention.

FIG. 2 shows another real example of a spin-valve MR sensor of this invention. In contrast with the real example of FIG. 1, the free magnetic layer 7 is formed on the substrate side, and the antiferromagnetic layer 4 is formed on the side opposite the substrate, with the order of each of the film layers reversed. The MR film 3 of this example has films of composition Ta 30 Å/NiFe 40 Å/CoFe 10 Å/Cu 22 Å/CoFe 20 Å/Ru 8.5 Å/CoFeB 20 Å/PtMn 250 Å/Ta 30 Å on a substrate. As explained above, the antiferromagnetic layer 4 is formed by layering afterward, so the base layer 2 is formed of a Ta film only.

In this real example also, as in the real example of FIG. 1, the pinned magnetic layer 5 has a three-layer structure including a first ferromagnetic film, nonmagnetic coupling film, and second ferromagnetic film. Moreover, the first ferromagnetic film 51 neighboring the antiferromagnetic layer 4 is formed of a Co-base ferromagnetic material with high resistivity, so that shunting of the current to the first ferromagnetic film is suppressed, and a high rate of magnetoresistive change is obtained.

Further, this invention can be implemented with a variety of modifications and alterations to the aforementioned real examples, within engineering limits. The aforementioned pinned magnetic layer can be given a multi-layer film structure with more layers than the abovementioned three layers, in which multiple ferromagnetic films and nonmagnetic coupling films are layered in alternation, so long as the ferromagnetic film neighboring the antiferromagnetic layer is formed from Co-base material with a high resistivity. In this case, the film thicknesses and materials (saturation magnetization values) of each of the ferromagnetic layers should be chosen such that the apparent magnetic moment of the pinned magnetic layer as a whole is substantially zero.

This invention has the above configuration, and so exhibits the advantageous results described below.

With the spin-valve magnetoresistance sensor of this invention, because the first ferromagnetic film on the antiferromagnetic layer side is formed from a high-resistivity Co-base material, shunting of the sense current to the first ferromagnetic film is suppressed, and declines in the rate of magnetoresistive change can be prevented. Hence both a high rate of magnetoresistive change and a high sensor sensitivity are obtained, and high recording densities in magnetic recording can be realized.

What is claimed is:

1. A spin-valve magnetoresistance sensor, comprising:
   a free magnetic layer;
   a pinned magnetic layer including first and second ferromagnetic films formed in layers to enclose a nonmagnetic coupling film, the first ferromagnetic film antiferromagnetically coupled to the second ferromagnetic films;
   a nonmagnetic layer enclosed between the pinned and free magnetic layers; and
   an antiferromagnetic layer neighboring the pinned magnetic layer, the antiferromagnetic layer formed over a substrate, the first ferromagnetic film neighboring the antiferromagnetic layer and formed of a high resistivity material consisting essentially of CoFeB, CoMnB, CoFeC, amorphous CoZrTa, amorphous CoZrNb, and amorphous CoZrMo.

2. The spin-valve magnetoresistance sensor of claim 1 wherein a product of a saturation magnetization of the first ferromagnetic film and a film thickness of the first ferromagnetic film is substantially equal to a product of a saturation magnetization of the second ferromagnetic film and a film thickness of the second ferromagnetic film.

3. The spin-valve magnetoresistance sensor of claim 1 wherein the spin-valve magnetoresistance sensor is included in a thin film magnetic head.

* * * * *